US006126377A

United States Patent [19]
Cruse

[11] Patent Number: 6,126,377
[45] Date of Patent: Oct. 3, 2000

[54] TOWING SKATES

[76] Inventor: Donald E. Cruse, Res. 653 Winston Road, Grimsby, Ontario, Canada, L3M 4E8

[21] Appl. No.: 09/253,115

[22] Filed: Feb. 19, 1999

Related U.S. Application Data

[60] Provisional application No. 60/075,229, Feb. 19, 1998.

[51] Int. Cl.$^7$ .................................................. B60B 30/10
[52] U.S. Cl. .............................. 414/430; 280/8; 280/79.4
[58] Field of Search .......................... 414/430; 280/8, 280/13, 79.4

[56] References Cited

U.S. PATENT DOCUMENTS

| | | | |
|---|---|---|---|
| 3,087,266 | 4/1963 | McEvoy | 280/13 |
| 3,285,447 | 11/1966 | Junion | 414/430 |
| 4,061,090 | 12/1977 | Callon | 108/51.1 |
| 5,266,378 | 11/1993 | Stephenson et al. | 188/32 |
| 5,314,287 | 5/1994 | Wichert | 414/427 |
| 5,396,963 | 3/1995 | Curry | 172/701.3 |
| 5,427,209 | 6/1995 | Tannehill et al. | 188/32 |
| 5,743,689 | 4/1998 | Schlaeger | 410/30 |

*Primary Examiner*—Douglas Hess
*Assistant Examiner*—Joseph A. Fischetti
*Attorney, Agent, or Firm*—Law Offices of Royal W. Craig

[57] ABSTRACT

Interlocking towing skates for placement beneath the tires of a vehicle prior to winching onto a flatbed. Two or more skates can be locked together in accordance with the tire width of the vehicle to be towed, and the interlocked skates are placed beneath each tire. The disabled vehicle can be winched quickly and easily upward along the flatbed. The friction of the tires is greatly reduced as the salvage vehicle is drawn upward, and personal injury and/or damage to the transmission and/or tow truck hoist is eliminated. The towing skates are formed as an elongate hard unitary plastic member having a chock at one end, a flat mid-section, and an opposing ramped end. A series of interlocking teeth protrude laterally from one side, and a mating series of interlocking recesses are formed in the other side for locking side-by-side skates together.

5 Claims, 5 Drawing Sheets

TOWING SKATES

CROSS-REFERENCE TO RELATED APPLICATIONS

The present application is based on provisional application no. 60/075,229, filed Feb. 19, 1998.

BACKGROUND OF THE INVENTION

1. Field of the Invention

The present invention relates to towing accessories for flatbed tow trucks and, more particularly, to interlocking towing skates for placement under the wheels of a vehicle to reduce friction during winching of the vehicle onto the flatbed.

2. Description of the Background

Flatbed tow trucks are generally operated by a power winch that draws a disabled vehicle upward and onto the bed of the truck. Unfortunately, vehicles in need of towing often have transmissions and/or brakes which cannot be disengaged by the towman. In this case winching creates an immense resistance between the rubber tires and the steel of the bed, and it becomes very difficult to draw the vehicle upward along the flatbed. Damage to the transmission and/or tow truck hoist can result, as can injury from snapping cables.

Towmen have implemented various home grown solutions to this problem, including lubrication of the wheels, or the placement of plastic or cardboard sheets underneath the wheels to reduce friction and facilitate sliding upward along the flatbed. However, these contrived methods are not always convenient. It can be messy and cumbersome to lubricate wheels, and flat sheets of plastic or cardboard have an annoying tendency of slipping out from beneath the tires during winching.

It would be greatly advantageous to provide a dedicated tow skate for placement under one or more vehicle tires prior to hoisting the vehicle onto a flatbed. Such a tow skate would reduce the friction of the tire and lessens the risk of damage and/or injury as the salvage vehicle is drawn onto the flatbed.

Of course, towmen must be prepared to salvage a wide variety of salvage vehicles with tires ranging greatly in width. It would be even more advantageous if the tow skate were likewise adaptable to different tires. A solution to this problem is herein suggested.

SUMMARY OF THE INVENTION

It is, therefore, an object of the present invention to provide a tow skate which may be placed under one or more of the salvage vehicle tires prior to hoisting onto a flatbed to reduce the friction of the tire as the salvage vehicle is drawn onto the flatbed.

It is another object to provide a tow skate which is adaptable to a wide variety of salvage vehicles with tires ranging greatly in width.

According to the present invention, the above-described and other objects are accomplished by providing interlocking towing skates for placement beneath the tires of a vehicle prior to winching onto a flatbed. Two or more skates can be locked together in accordance with the tire width of the vehicle to be towed, and the interlocked skates are placed beneath each tire. The disabled vehicle can be winched quickly and easily upward along the flatbed. The friction of the tires is greatly reduced as the salvage vehicle is drawn upward, and personal injury and/or damage to the transmission and/or tow truck hoist is eliminated. The towing skates are formed as an elongate hard unitary plastic member having a chock at one end, a flat mid-section, and an opposing ramped end. The towing skate is formed of a molded hard plastic having a low coefficient of friction. A series of interlocking teeth protrude laterally from one side, and a mating series of interlocking recesses are formed in the other side for locking side-by-side sates together. In addition, the skate is formed with a series of elongate ribs extending along the entire underside. The ribs serve as runners and further reduce the coefficient of friction of the skate.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
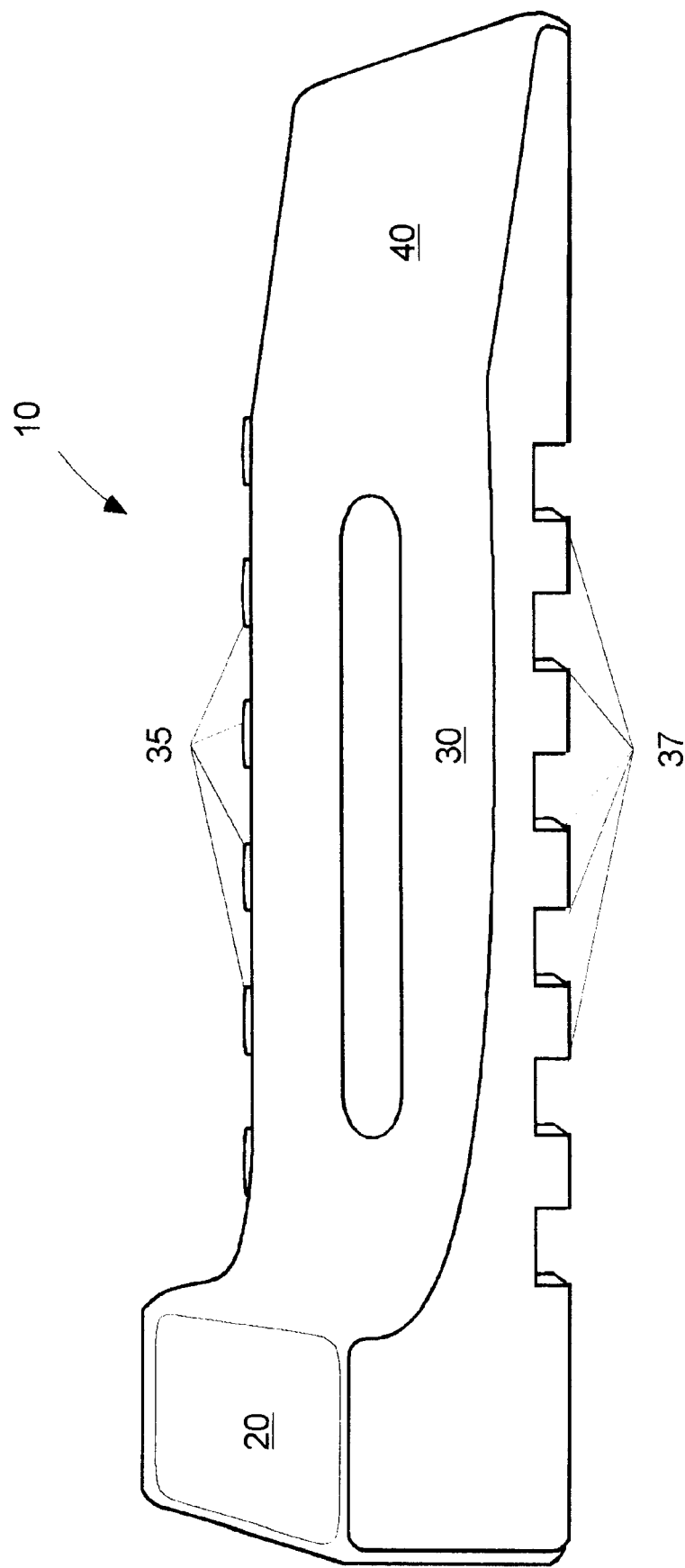
FIG. 1 is a side perspective illustration of a towing skate according to the present invention.

FIG. 1 is a side perspective illustration of a towing skate 10 according to the present invention. The towing skate 10 is preferably an elongate hard unitary plastic member having a chock 20, mid-section 30 and ramped end 40. The towing skate 10 is most cost-effectively formed of molded plastic having a low coefficient of friction. Thermoplastic is currently preferred, and molding may be accomplished by a conventional injection molding machine.

It should be realized that other durable yet low-coefficient-of-friction materials may be suitable including wood, metal or fiberglass, and all are considered to be within the spirit and scope of the invention.

Figure 2:
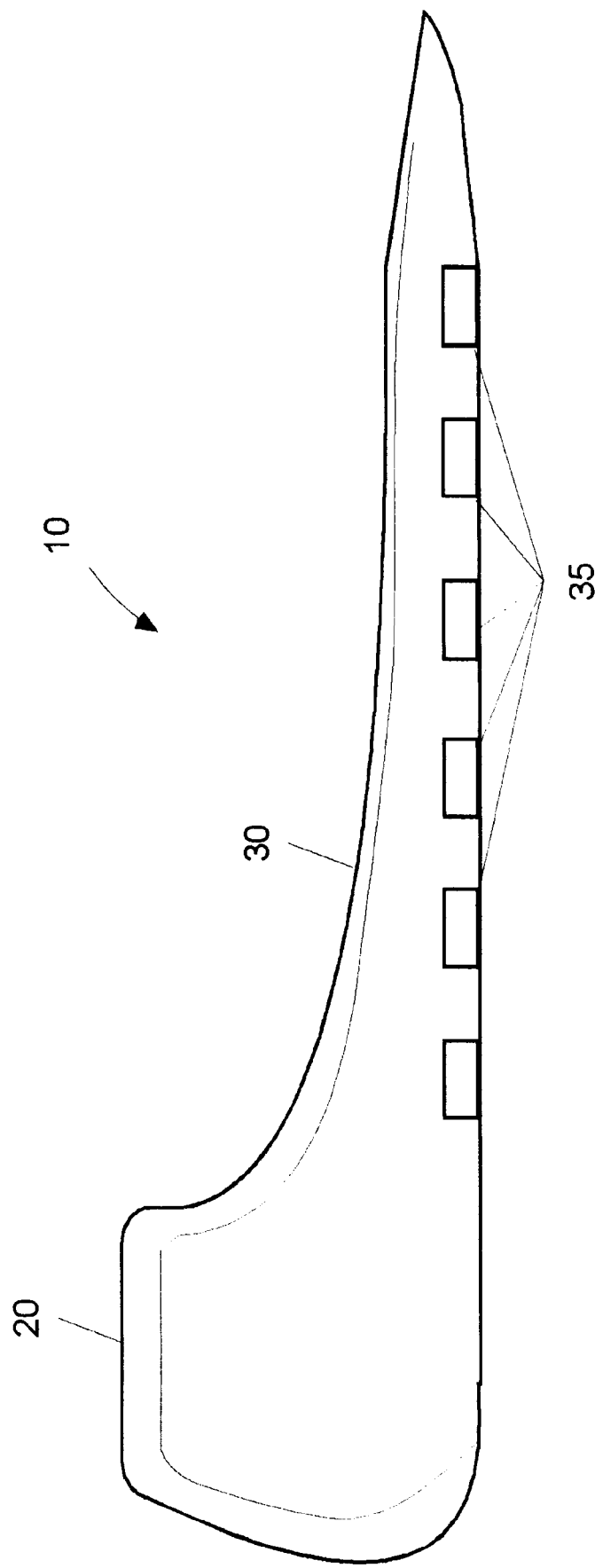
FIG. 2 is a side view of the towing skate of FIG. 1.

FIG. 2 is a side view of the towing skate 10 of FIG. 1. Chock 20 is raised block of approximately 2½ to 4" thickness and is intended to chock the tire of the vehicle being towed to thereby prevent towing skate 10 from sliding out from underneath the tire during winching.

Mid-section 30 is a flat elongate length of approximately 1" thickness, and this is the section that bears the weight of the vehicle during towing.

Ramped end 40 facilitates placement of the towing skate 10 underneath a vehicle tire (or driving of the vehicle onto the skate 10).

Chock 20 is approximately 2½" long at the top and ramps down into mid-section 30. Mid-section 30 is approximately 10½" long, and ramped end 40 is approximately 3" long, all of which combine to give a towing skate of approximately 16" length and 4" width.

Figure 3:
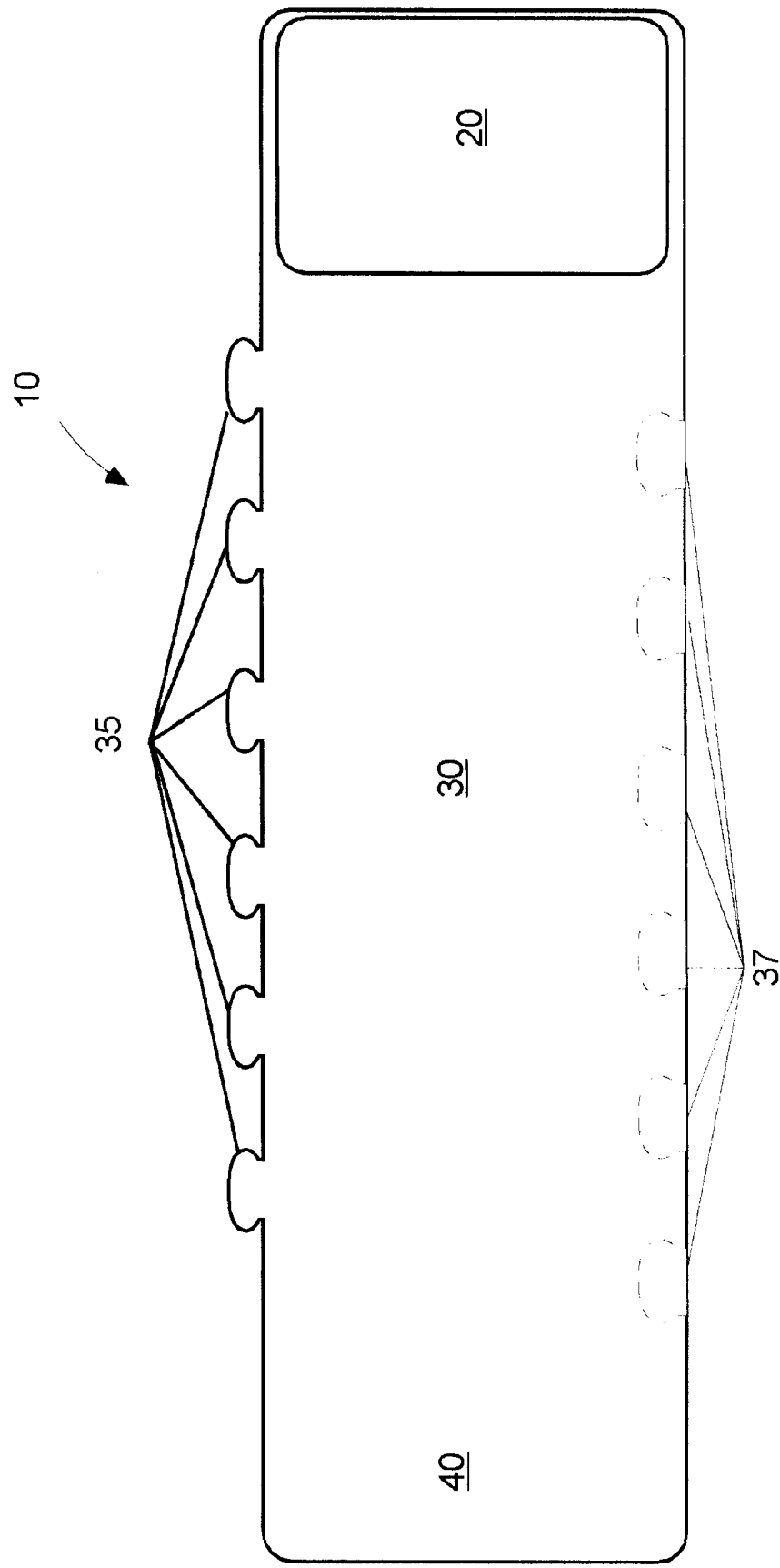
FIG. 3 is a top view of the towing skate of FIGS. 1 and 2.

FIG. 3 is a top view of the towing skate of FIGS. 1 and 2. Mid-section 30 is defined by a series of six interlocking teeth 35 protruding laterally from one side (here the left side). Each tooth is flared outward slightly, e.g., each tooth protrudes along a slightly convex stem.

Figure 4:
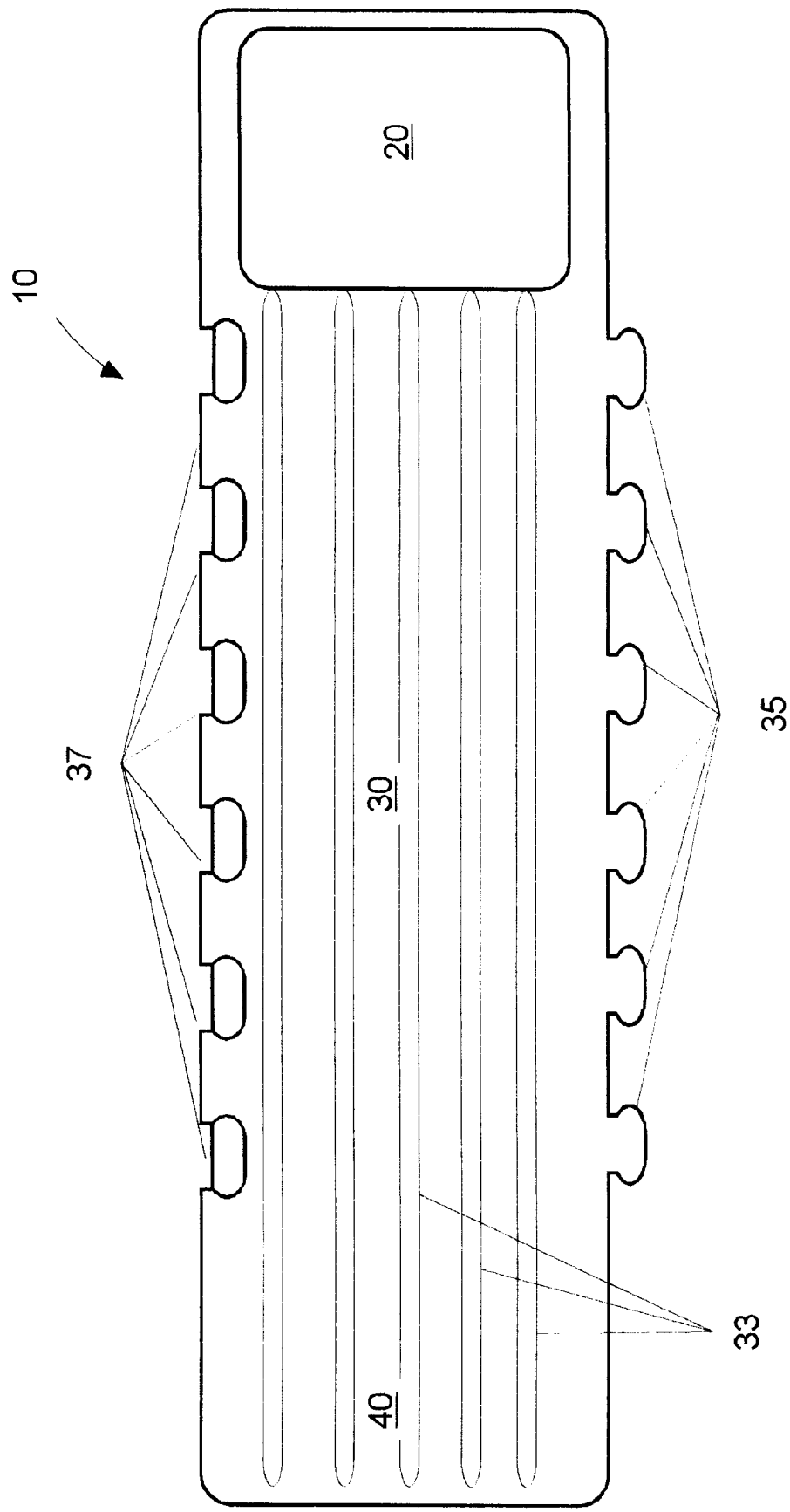
FIG. 4 is a bottom view of the towing skate of FIGS. 1–3.

FIG. 4 is a bottom view of the towing skate of FIGS. 1–3. The other side of mid-section 30 (opposite teeth 35) is defined by a mating series of six interlocking recesses 37 which are molded or otherwise formed directly in the side of mid-section 30. Recesses 37 enter laterally from the side (here the right side). Each recess 37 is evenly spaced along the side of mid-section 30 and is flared slightly to conform to a corresponding tooth 35.

A series of elongate ribs 33 are integrally molded along the entire underside of the skate 10 and extend the length of mid-section 30. Ribs 33 serve as runners and further reduce the coefficient of friction of the skate 10.

Figure 5:
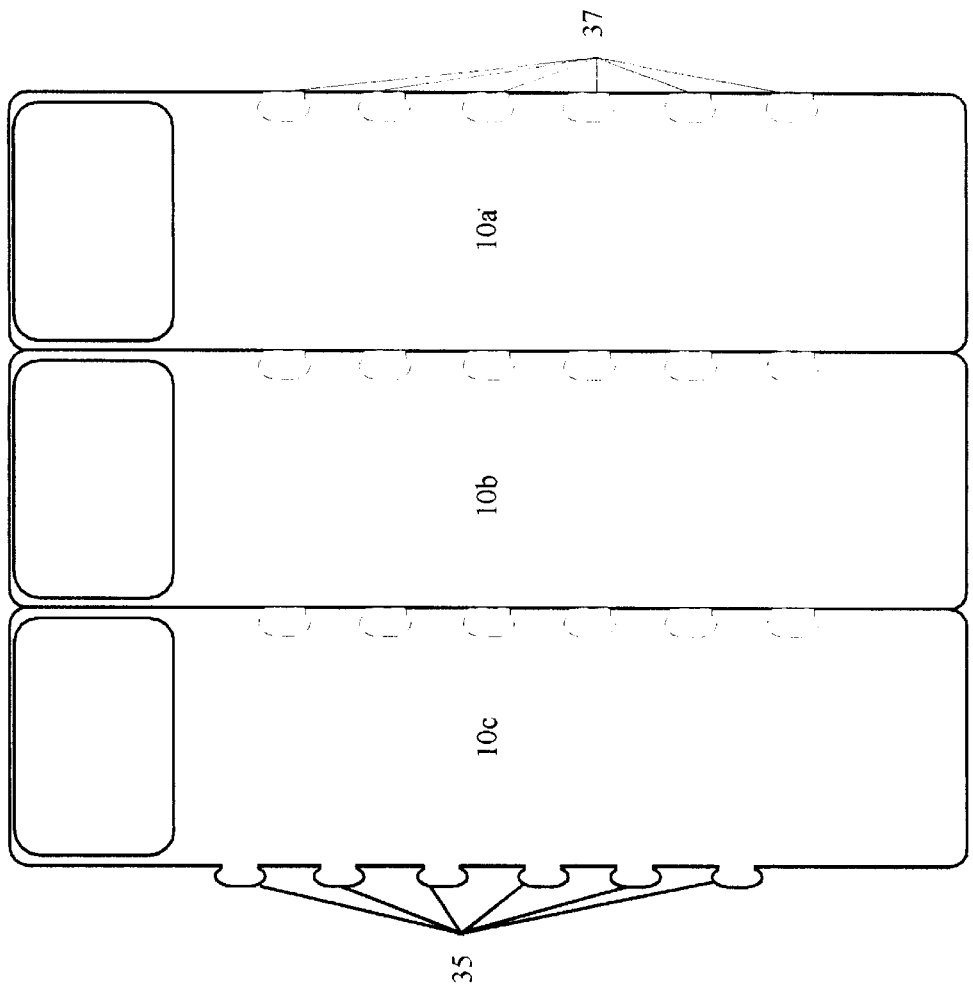
FIG. 5 is a cross-section of a plurality of the skates of FIGS. 1–4 illustrating the manner in which they interlock.

FIG. 5 is a cross-section of a plurality of the skates of FIGS. 1–4 illustrating the manner in which they interlock. Any number of skates 10 can be locked together to accommodate tires of virtually any width. Locking is accomplished by bringing two skates 10a and 10b together and by fitting the six interlocking teeth 35 protruding laterally from the left side of skate 10a into the six corresponding recesses 37 in the right side of mid-section 30 of skate 10b. This process is repeated as desired to add additional skates 10c. The adjoining skates 10 become firmly locked and are securely held together by the weight of the vehicle.

In using the towing skates 10 of the present invention, it is envisioned that each tow crew will carry a supply of skate 10 in their flatbed truck. Upon encountering a disabled vehicle, the towmen will first lock the requisite number of skates 10 together in accordance with the tire width of the vehicle to be towed. The interlocked skates 10 will then be placed beneath each tire, and the disabled vehicle can be winched quickly and easily upward along the flatbed. The friction of the tires is greatly reduced as the salvage vehicle is drawn upward, and personal injury and/or damage to the transmission and/or tow truck hoist is eliminated.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A towing accessory to facilitate hoisting of a salvage vehicle onto a flatbed having an upper support surface, comprising:

a skate formed from a plastic material for slidably carrying a vehicle tire thereon; and first interlocking means along one side of said skate, and second mating interlocking means along another side of said skate for locking another like skate together in a side-by-side configuration to accommodate wider vehicle tires;

whereby said skate is positioned between said vehicle tire and said upper support surface of said flatbed carries said vehicle tire to slidably reduce friction as said salvage vehicle is drawn onto said flatbed.

2. The towing accessory according to claim 1, wherein said first interlocking means further comprises a series of interlocking teeth protruding laterally along one side of said skate, and said second interlocking means further comprises a mating series of interlocking recesses along an opposing side.

3. The towing accessory according to claim 1, wherein said skate further comprises an integral member formed from a plastic material and with a raised chock at one end, an elongate mid-section, and an opposing ramped edge.

4. A towing skate to facilitate hoisting of a salvage vehicle onto a flatbed having an upper support surface, comprising a unitary member formed from a plastic material and having an elongate mid-section for bearing a tire of said salvage vehicle, a raised chock at one end of said mid-section for chocking said tire, and an opposing ramped edge at an opposing end of said mid-section to provide an off-ramp for said tire, said mid-section being formed with a series of interlocking teeth protruding laterally along one side, and a mating series of interlocking recesses along an opposing side, whereby said skate is positioned between said tire and said upper support surface of said flatbed to reduce reduces friction as said salvage vehicle is hoisted onto said flatbed, and said teeth and mating recesses along the mid-section serving to lock side-by-side skates together to span wider vehicle tires.

5. The towing skate according to claim 4, further comprising a plurality of elongate ribs extending along an underside of said mid-section, said ribs serving as runners to further reduce friction as said salvage vehicle is hoisted onto said flatbed.

* * * * *